(12) United States Patent
Lavrentovich et al.

(10) Patent No.: US 6,897,915 B1
(45) Date of Patent: May 24, 2005

(54) NON-LITHOGRAPHIC PHOTO-INDUCED PATTERNING OF POLYMERS FROM LIQUID CRYSTAL SOLVENTS WITH SPATIALLY MODULATED DIRECTOR FIELDS

(75) Inventors: Oleg D. Lavrentovich, Kent, OH (US); Dmitry Voloschenko, Schaumburg, IL (US); Sergij Shiyanovskii, Kent, OH (US)

(73) Assignee: Kent State University, Kent, OH (US)

( * ) Notice: Subject to any disclaimer, the term of this patent is extended or adjusted under 35 U.S.C. 154(b) by 238 days.

(21) Appl. No.: 09/966,294

(22) Filed: Sep. 27, 2001

Related U.S. Application Data
(60) Provisional application No. 60/235,756, filed on Sep. 27, 2000.

(51) Int. Cl.[7] .............................................. G02F 1/1333
(52) U.S. Cl. ........................ 349/88; 349/115; 349/123
(58) Field of Search .............................. 349/88, 84, 115, 349/123

(56) References Cited

U.S. PATENT DOCUMENTS

| | | | |
|---|---|---|---|
| 4,637,896 A | | 1/1987 | Shannon |
| 5,680,185 A | * | 10/1997 | Kobayashi et al. ............ 349/88 |
| 5,721,597 A | * | 2/1998 | Kakinuma et al. ............ 349/86 |
| 5,766,694 A | * | 6/1998 | West et al. .................. 427/510 |
| 5,831,700 A | * | 11/1998 | Li et al. ........................ 349/88 |

(Continued)

FOREIGN PATENT DOCUMENTS

| | | | |
|---|---|---|---|
| GB | 2 023 864 | * | 1/1980 |
| GB | 2 121 226 | * | 12/1983 |
| GB | 2 329 481 | * | 3/1999 |
| GB | 2 329481 | * | 3/1999 |
| JP | 56-138712 | * | 10/1981 |
| JP | 6-51289 | * | 2/1994 |
| WO | WO 96/06380 | * | 2/1996 |
| WO | WO 00/49452 | * | 8/2000 |

OTHER PUBLICATIONS

V. Vorflusev et al., "Phase–Separated Composite Films for Liquid Crystal Displays", *Science*, vol. 283, Mar. 19, 1999, pp 1903–1905.

D. Voloschenko, et al., "Effect of Director Distortions on Polymer–Liquid Crystal Phase Separation", found at http://arxiv.org/archive/cond–mat, Manuscript No.: condmat/0109473, pp 1–11, Sep. 25, 2001.

*Primary Examiner*—Nathan J. Flynn
*Assistant Examiner*—Ahmed N. Sefer
(74) *Attorney, Agent, or Firm*—Fay, Sharpe, Fagan, Minnich & McKee, LLP

(57) ABSTRACT

A liquid crystal device comprises a first and second cell wall structure; at least one liquid crystal material disposed within a space between the first and second cell wall structures; and polymer micro-structures, wherein the micro-structures are formed by polymerizing a prepolymer, and wherein said micro-structures have a shape and spatial location determined by said liquid crystal material. Permanent polymer micro-structures are formed from a liquid crystal with a non-uniform spatially modulated director field. The polymer structures have the shape and spatial location dictated by the non-uniform director field of the liquid crystal. The micro-structures are a backbone that restores the liquid crystal director field that existed during the polymerization process even when other factors, such as electric field, temperature, or surface anchoring, do not favor this restoration. The polymer micro-structures can be used in optical devices, such as diffraction gratings and deflecting and beam steering devices, and in micro-mechanical and micro-fluidic devices.

13 Claims, 5 Drawing Sheets

U.S. PATENT DOCUMENTS

| | | | |
|---|---|---|---|
| 5,923,394 A * | 7/1999 | Miyazaki et al. | 349/172 |
| 5,942,154 A * | 8/1999 | Kim et al. | 252/299.01 |
| 5,949,508 A * | 9/1999 | Kumar et al. | 349/122 |
| 6,122,024 A * | 9/2000 | Molsen et al. | 349/88 |
| 6,191,836 B1 * | 2/2001 | Woo et al. | 349/124 |
| 6,203,723 B1 * | 3/2001 | Hsu | 252/299.01 |
| 6,208,398 B1 * | 3/2001 | Scherer et al. | 349/124 |
| 6,221,444 B1 * | 4/2001 | Okada et al. | 428/1.25 |
| 6,222,605 B1 * | 4/2001 | Tillin et al. | 349/167 |
| 6,373,541 B1 * | 4/2002 | Sekime et al. | 349/117 |
| 6,383,579 B1 * | 5/2002 | Park et al. | 428/1.26 |
| 6,512,569 B1 * | 1/2003 | Acosta et al. | 349/181 |
| 6,545,739 B1 * | 4/2003 | Matsumoto et al. | 349/198 |
| 6,583,838 B1 * | 6/2003 | Hoke et al. | 349/134 |
| 2003/0103175 A1 * | 6/2003 | Yamaguchi et al. | 349/113 |
| 2004/0032561 A1 * | 2/2004 | Kumar et al. | 349/156 |

* cited by examiner

NON-LITHOGRAPHIC PHOTO-INDUCED PATTERNING OF POLYMERS FROM LIQUID CRYSTAL SOLVENTS WITH SPATIALLY MODULATED DIRECTOR FIELDS

CROSS REFERENCE TO RELATED APPLICATIONS

This application claims benefit of pending U.S. Provisional Application No. 60/235,756 filed on Sep. 27, 2000.

STATEMENT REGARDING FEDERALLY SPONSORED RESEARCH OR DEVELOPMENT

The United States Government has a paid-up license in this invention and may have the right in limited circumstances to require the patent owner to license others on reasonable terms as provided for by the terms of Grant DMR 89-20147, awarded by the National Science Foundation, and Grant F49620-96-1-0449, awarded by the Air Force Office of Scientific Research.

BACKGROUND OF THE INVENTION

The present invention relates to polymer-liquid crystal mixtures, and more specifically to forming of polymer architectures such as polymer micro-walls using polymerization in the liquid crystalline matrix with spatially distorted director fields.

The electro-optic properties of polymer-liquid crystal mixtures have made them useful as elements of various optical devices. Depending on the relative polymer concentration in the mixture, different types of devices have been demonstrated. When the concentration of polymer significantly exceeds that of the liquid crystal (LC), a polymer dispersed liquid crystal (PDLC) type of device is realized, where the LC is suspended in the form of small droplets in a surrounding polymer matrix. Light, heat, or solvent evaporation can be utilized to induce the desired phase separation. Light scattering characteristics of the device are dependent upon the orientation of molecules within the LC. In a second type of device, the concentration of polymer is significantly lower than that of the LC. In this case, a polymer stabilized type of device is realized. The LC is mixed with a prepolymer (monomer), which is then polymerized. Polymerization of the monomer creates a polymer network which stabilizes the LC structure, enabling, e.g., creation of bistable LC displays.

When concentrations of the polymer and the LC are roughly of the same order of magnitude, it is possible, by implementing a holographic two-beam recording technique, to form an inhomogeneous periodic morphology which consists of a crosslinked polymer network with embedded LC droplets. This is described by Pogue et al. in *SPIE*, 3475, pp. 2–11 (1998). Large droplet size contributes significantly to unwanted light-scattering, and it is therefore desirable to reduce the size of the droplets as much as possible. As shown by Kim et al., *Appl. Phys. Lett.* 72(18), pp. 2252–2253 (1998), it is possible to directionally phase-separate the LC and polymer components in a high-voltage electric field using lithographic patterning of electrodes on a confining substrate. A difference in dielectric permittivity of the components plays a role in the phase separation.

A technique for the design of switchable diffractive elements with a memorized structure is needed. Shorter switching times and less light-scattering are desired. Reliable techniques for producing polymer architectures such as walls at micron scales would be advantageous for stabilizing the LC structure, reducing the light scattering and switching times. The polymer architectures can be used by themselves (by washing the LC out of the sample, e.g., in micromechanical and in micro-optical devices).

BRIEF SUMMARY OF THE INVENTION

The first aspect of the present invention is to provide a liquid crystal device having a memorized structure, wherein the structure comprises polymer micro-structures such as micro-walls formed by using a spatially modulated director field.

Another aspect of the present invention is to provide a method for manufacturing the liquid crystal device set forth above, wherein the intrinsic mesogenic properties of the liquid crystal are employed to determine the memorized structure of the polymer. This method enables reliable micron-scale patterning of polymer architectures.

Yet another aspect of the present invention is to provide a technique for forming polymer micro-structures such as micro-walls. The micro-structures form at locations where there are variations in the director field of the liquid crystal.

The foregoing and other aspects of the present invention, which shall become apparent as the detailed description proceeds, are achieved by a liquid crystal device comprising a pair of opposed substrates having a gap therebetween; a liquid crystal material disposed in said gap and polymer micro-structures formed between said substrates, wherein the micro-structures are formed by polymerizing a prepolymer, and wherein said micro-structures have a shape and spatial location determined by said liquid crystal material.

Other aspects of the present invention are attained by a method for fabricating a liquid crystal device having polymer micro-structures, the method comprising the steps of preparing a mixture comprising a liquid crystal material and a prepolymer; providing a first and second cell wall structure, said first and second cell wall structure optionally having electrodes disposed on facing sides of said first and second cell wall structures, and optionally having an alignment layer disposed on at least one of said electrodes; disposing said mixture into a space between the first and second cell wall structures; causing said liquid crystal material to assume a predetermined orientation with a non-uniform spatially distorted director field; and exposing said mixture to conditions which cause polymerization of the prepolymer and formation of polymer micro-structures between the cell walls.

The present invention also provides a method for forming polymer micro-structures, the method comprising the steps of preparing a mixture comprising a liquid crystal material and a prepolymer; providing a first and second cell wall structure; disposing said mixture into a space between the first and second cell wall structures; causing said liquid crystal material to assume a predetermined orientation with a non-uniform spatially distorted director; and exposing the mixture to conditions which cause polymerization of the prepolymer and formation of polymer micro-structures between the cell walls.

These and other aspects of the present invention, as well as the advantages thereof over existing prior art forms, which will become apparent from the description to follow, are accomplished by the improvements hereinafter described and claimed.

As used herein, the term "director" refers to the average orientation of the molecules of a liquid crystal material. The phrase "spatially modulated director fields" refers to changes in the orientation of the director from one point to another in a liquid crystal sample. A non-uniform spatially modulated director field refers to a director field having variations in the rate of director changes at different positions within a liquid crystal sample.

DETAILED DESCRIPTION OF THE INVENTION

Figure 1A:
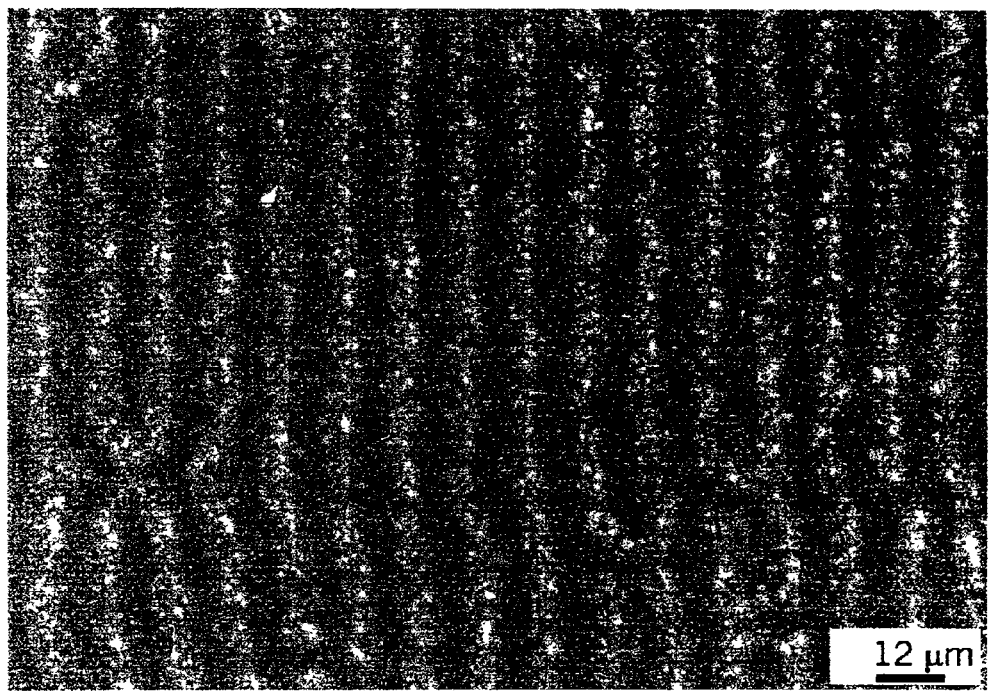
FIG. 1(a) is a microphotograph of a liquid crystal cell with an applied voltage V>2.5 Volts, showing chains of polymer particles which form polymer micro-structures such as micro-walls.

It has now been found that permanent polymer microstructures, such as micro-walls, can be created on the sub-micron scale using the intrinsic mesogenic properties of the LC component in a polymer-LC mixture. The microstructures self-assemble by exposing a texture, formed by a spatially distorted LC mixed with a prepolymer, to conditions which cause polymerization of the prepolymer. Suitable LC materials include nematic, cholosteric, smectic and columnar LC materials. The amount of the pre-polymer added to the LC is between about 0.1 percent and about 50 percent, such that the mixture preserves its mesogenic (either nematic, cholesteric smectic or columnar) properties at a predetermined temperature. A distorted arrangement of LC molecules enables the design and implementation of various molecular architectures of the polymer component.

Polymerization-inducing conditions cause phase separation of components in a LC-polymer mixture. The polymerization-inducing conditions may be selected from a wide variety of conditions known in the art according to the requirements of a particular application. In one embodiment, for example, the prepolymer is a UV-curable prepolymer. Suitable UV-curable pre-polymer materials include, but are not limited to, monomers whose polymerization is of a thiolene-photoinitiated step-growth type, such as NOA-65 (available from Norland Products, Inc.). In such a case, the polymerization-inducing conditions will include exposure of the liquid crystal material/prepolymer mixture to ultraviolet radiation. In another embodiment, the prepolymer is a heat-curable prepolymer and the polymerization-inducing conditions include exposure of the liquid crystal material/prepolymer mixture to a temperature elevated above room temperature, i.e. above about 20° C.

The phase separation in the presence of a spatially modulated LC director field results in formation of polymer micro-structures in the LC cell. While not wishing to condition patentability on any particular theory, there are at least three possible mechanisms by which the micro-structures form: (1) Since the liquid crystal is an elastic medium, the phase separating component such as polymer (or other material) might be forced to accumulate in the sites with the highest energy of director distortions; (2) polymer density might vary because of spatial changes of the angle between polarization director of light used to cause phase separation and to cure the prepolymer, and the director; (3) variations in intensity of light that is used to cure the prepolymer, caused by "lens" effects in the distorted birefringent liquid crystal. In all these cases, phase separation and polymerization from a non-uniformly distorted liquid crystal would lead to a spatial variation in the density of the phase separating component (polymer), as dictated by the spatial variation of the director field. Using this technique, it is possible to make micro-structures between the substrates of a cell, e.g., periodic polymer-LC diffractive gratings.

Figure 4:
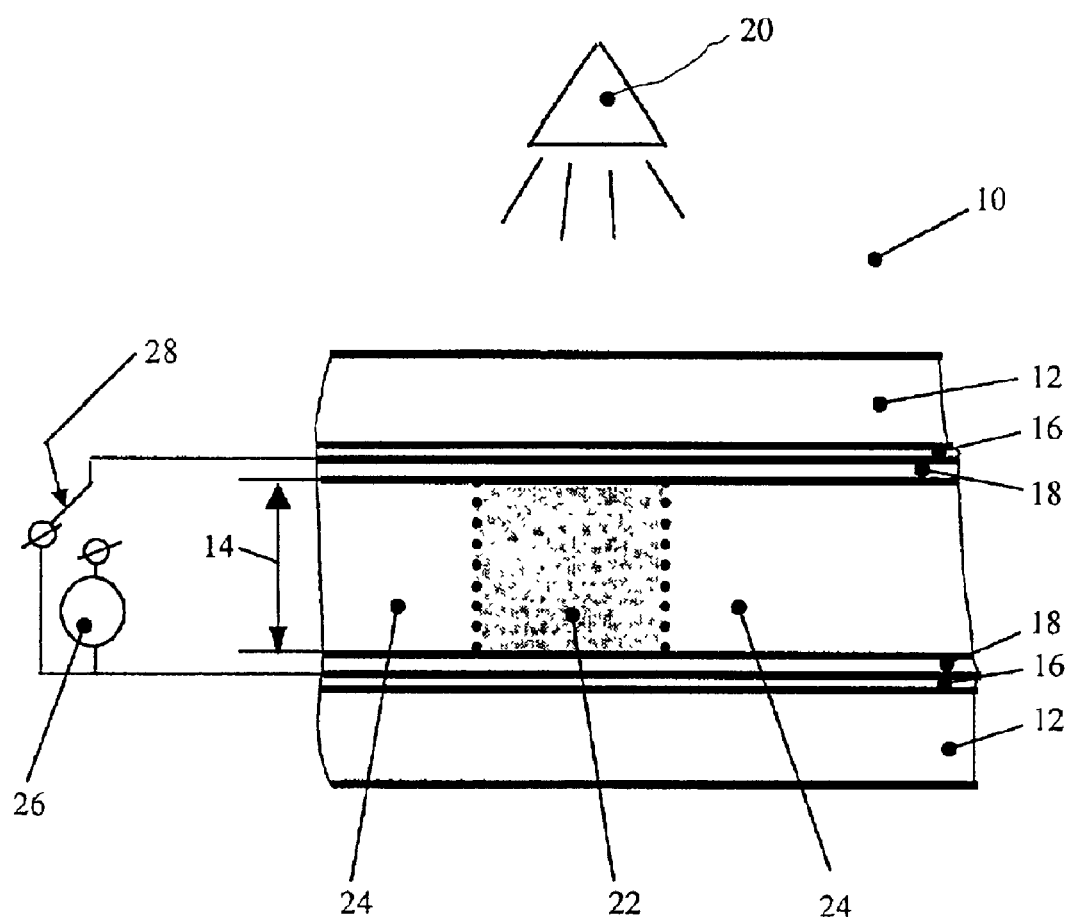
FIG. 4 is a schematic representation of a device used to implement the method according to the present invention.

Referring now to the drawings, and in particular, to FIG. 4, it can be seen that a device according to the present invention is designated generally by the numeral 10. The device 10 includes a pair of opposed, optically clear substrates 12, which may be glass, plastic or other material commonly known in the art. The substrates are arranged such that a cell gap 14 exists therebetween. The cell gap may be formed with spherical spacers or rods. An electrode 16 may be provided on the inside (facing) surfaces of each of the substrates 12. In a preferred embodiment, each electrode 16 comprises indium-tin oxide.

An alignment layer 18 may be provided adjacent to electrodes 16 in order to control the orientation of the material enclosed between the substrates 12. One or both of the substrates 12 may be treated with an appropriate alignment layer in order to obtain the desired optical performance of the liquid crystal device 10. The alignment layer may comprise polymers such as polyimides, deposited layers of silicon oxide and surfactants. In one embodiment, the alignment layer comprises a polyimide. Rubbing techniques, photoaligning techniques, coating with surfactants, and other techniques for preparing alignment layers are known in the art. In one particular embodiment, the alignment layer is formed by JALS-204 (Japan Synthetic Rubber Co., Inc.).

The director field of a LC device indicates the direction of preferred orientation. Proper preparation of the alignment layer can produce alignment of the director field in almost any direction. In one embodiment, the alignment layer produces a homogeneous planar geometry of the director field, which corresponds to alignment of the director field parallel to the substrate surface. In another embodiment, the alignment layer produces a homeotropic geometry of the director field, which corresponds to alignment of the director field perpendicular to the substrate surface. In still another embodiment, the alignment layer produces a homogeneous tilted geometry of the director field. In yet another embodiment, the alignment layer produces a patterned geometry of the director field with different alignment properties at different regions of the cell.

A mixture of a liquid crystal material and a pre-polymer is disposed in the cell gap 14. The liquid crystal has a non-uniform spatially distorted director. The non-uniform spatial director distortions determine the polymer microstructure that forms during phase separation and polymerization process. There are numerous ways to control the non-uniform director field of the liquid crystal and thus to design the desired polymer micro-structure. One way is to use a cholesteric or chiral nematic liquid crystal. In an ideal cholesteric, the director forms a helix because of the chiral nature of the mesogenic molecules. In a bounded sample (for example, inside gap 14) the cholesteric structure might acquire additional distortions caused by the type of surface alignment set by the alignment layer(s) 18, especially when the cholesteric helicoidal axis is in the plane of the sample (so-called "fingerprint cholesteric structure"). Another way is to apply a voltage across electrodes 16. In one embodiment, two aligning layers 18 are formed in such a way that the rubbing directions are mutually perpendicular. A nematic liquid crystal filled in gap 14 for such a cell would acquire twist deformations with the director continuously twisting from the top substrate to the bottom. There will be left and right twists between the substrates, with domain boundaries separating the domains of left and right twist. These domain boundaries serve as the places where the polymer accumulates during polymerization. Other designs are possible, in which the director structures are distorted by the applied electric or magnetic fields. For example, a planar cholesteric layer with helical axis being initially perpendicular to the substrates 12, can be distorted by applying an electric voltage to the electrodes 16; the field reorients the helical axis away from the initial orientation perpendicular to the bounding plates and thus creates a non-uniformly distorted director structure, periodic in one or two directions in the plane of the liquid crystal cell. In any event, once the desired director structure is achieved, the prepolymer dissolved in the liquid crystal is polymerized by, for example, exposure to radiation from a UV source 20. As the polymer forms, phase separation occurs. The polymer forms a micro-structure 22 surrounded by the liquid crystal 24. The spatial shape and position of the micro-structure is defined by the spatially modulated director field. In one embodiment, the micro-structures are affixed to at least one of the substrates.

A power source 26 may be attached to the electrodes 16 through a switch 28. Operation of the switch 28 may be controlled by an appropriately designed electronic drive.

In one embodiment, polymer micro-structures are formed using a fingerprint texture of a cholesteric liquid crystal. Cholesteric liquid crystals are sometimes called chiral-nematic liquid crystals. They are formed by some optically active organic compounds, such as cholesteryl chloride, or mixtures of such compounds, or by mixing optically active compounds with ordinary nematic liquid crystals. A cholesteric has a helical structure, and the director rotates spatially about an axis perpendicular to itself. The distance for a 360° turn of the director is commonly referred to as the pitch, which may be of the order of a wavelength of light. In the ideal unbounded cholesteric phase comprising nematic liquid crystals doped with optically active molecules, the pitch is defined by the concentration of the chiral dopant in the nematic matrix.

The cholesteric material is mixed with a pre-polymer material and confined between two transparent electrodes with either homogeneous planar or homeotropic alignment layers. Suitable pre-polymer materials include, but are not limited to, UV-curable monomers whose polymerization is of a thiolene-photoinitiated step-growth type, such as NOA-65 (available from Norland Products, Inc.).

The fingerprint texture of a cholesteric liquid crystal is the pattern formed when the helical axes are parallel to the substrates 12. When a homogeneous planar alignment layer is utilized, the fingerprint texture is created by applying an electric field to the cholesteric mixture. The applied electric field will preferably be from about 0.1 V to about 100 V, preferably from about 0.1 V to about 10 V, and will vary depending upon the values of cell gap 14, confinement ratio d/p, and anisotropy in the dielectric permittivity of the liquid crystal. In homeotropic geometry, no field is necessary to sustain a fingerprint texture because it exists at zero field. During the "writing process" (the process by which the polymer micro-structures are formed), exposure to light (usually, in the UV part of the spectrum) causes polymerization of the pre-polymer with its subsequent phase separation from the cholesteric. The polymer forms microstructures as it polymerizes on a confining substrate. The micro-structures are permanently affixed, and portray the structure of the fingerprint texture. The micro-structures are either continuous or resemble chains of polymer particles. Applying a higher voltage to the cholesteric, one can remove the fingerprint texture, but cannot remove the formed polymer micro-structures. In switching the structure back to the fingerprint state, the polymer structures are a backbone on which the exact original texture that was used in the writing process restores itself. The stabilization of the fingerprint texture in the irradiated cell is caused by the change in surface alignment at the boundaries, namely, by the imprint formed by the polymer. Micro-structures are created non-lithographically through the presence of director modulations, their thickness is defined by a characteristic width of director modulations. The micro-structures can first appear in the bulk of the cell or at the confining substrate and grow as the process of polymerization proceeds. As the polymer structures grow in size, they adhere to the confining substrates. In cholesteric fingerprint structures, accumulation of the polymer at one or both substrates is facilitated by the fact that the cholesteric director distortions are stronger near the surfaces than in the bulk of the cell. Surface anchoring sets a particular direction of director at the substrates and the cholesteric helical twist is usually incompatible with such a unidirectional alignment, thus the director is strongly distorted near the surface to accommodate for both the surface anchoring direction and the helicoidal twist in the bulk. Usually, the micro-structures are permanently affixed (i.e., they are stable against gentle mechanical action or against solvents that might dissolve the liquid crystal and wash out from the cell but leave the polymer microstructures intact), and portray the structure of the fingerprint texture. In prior art, the structures were created lithographically, their thickness was defined by the size of inter-pixel areas (typically, 5–6 microns). With microstructures made using director modulations, forming microstructures with thicknesses of 1 micron is simplified.

EXAMPLE 1

Figure 1B:
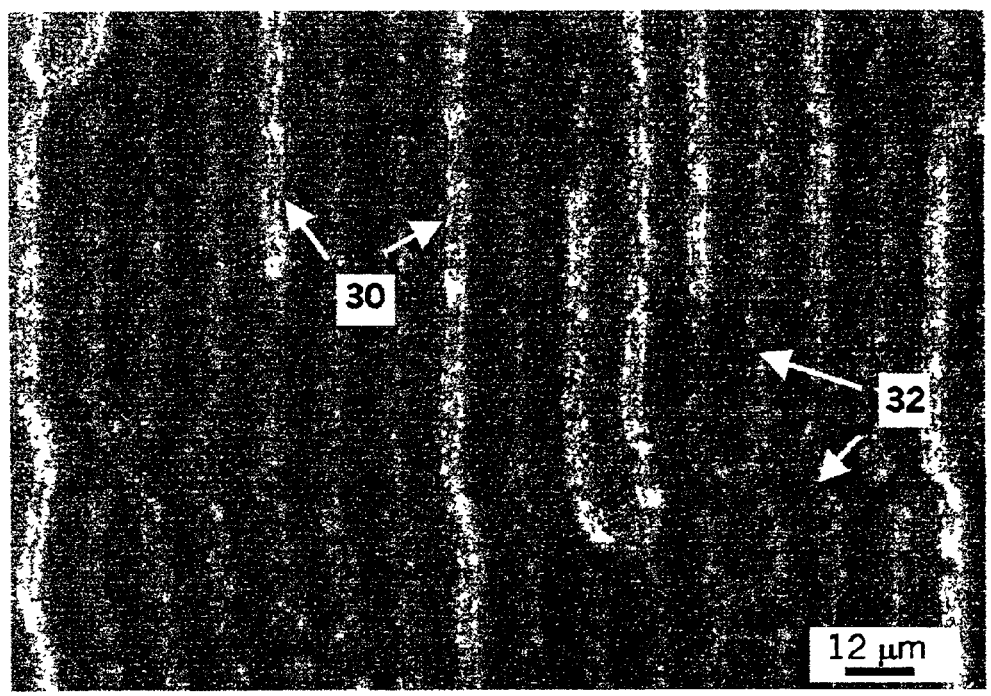
FIG. 1(b) is a microphotograph of a liquid crystal cell with an applied voltage V<2.5 Volts, showing texture growth on top of the polymer micro-structures.

In Example 1, polymer micro-structures were formed in cholesteric cells with a homeotropic geometry. A LC cell was assembled from a pair of glass plates coated with transparent electro-conductive layers of indium tin oxide and a lecithin surfactant. A cholesteric mixture of E7 and CB15 (both from EM Industries) with a pitch p of about 6 microns was mixed with 5.0 percent by weight of the UV-curable optical adhesive NOA-65. The mixture was introduced into a cell of gap d of about 5.0 microns. The mixture was in the cholesteric phase at room temperature. In such a cell fingerprint texture exists at zero applied field. The cell was exposed to a low power non-polarized UV light of wavelength $\lambda$=366 nanometers for about 10 minutes. Under such conditions, cross-linking of the pre-polymer NOA-65 occurs, with a subsequent phase separation of the liquid crystal from a formed polymer. Applying a voltage V of about 2.5 Volts at a frequency $f$ of about 1 kiloHertz brings the cholesteric into a quasi-homeotropic state and removes the fingerprint texture. The polymer micro-walls are visible through a microscope, as shown in FIGS. 1(a) and (b). The fingerprint texture restores itself if the voltage is switched off. FIG. 1(b) shows how separate fingers of the texture 30 grow on top of the polymer micro-walls 32.

EXAMPLE 2

In Example 2, polymer imprints were formed in cholesteric cells with a planar geometry. The liquid crystal cell was assembled from a pair of glass plates coated with transparent electro-conductive layers of indium tin oxide and unidirectionally rubbed polyimide PI-2555 (available from Du Pont). The cholesteric/pre-polymer mixture, described above in Example 1, was introduced into a cell of gap d of about 7 microns.

Figure 2A:
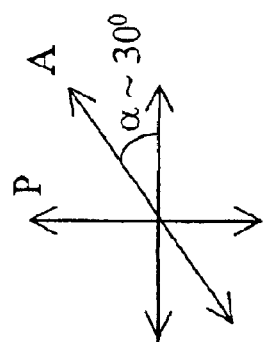
FIG. 2(a) is a microphotograph of a liquid crystal cell with an applied voltage V=2.6 Volts (f=1 kHz), showing polymer micro-walls in planar geometry.
Figure 2A:
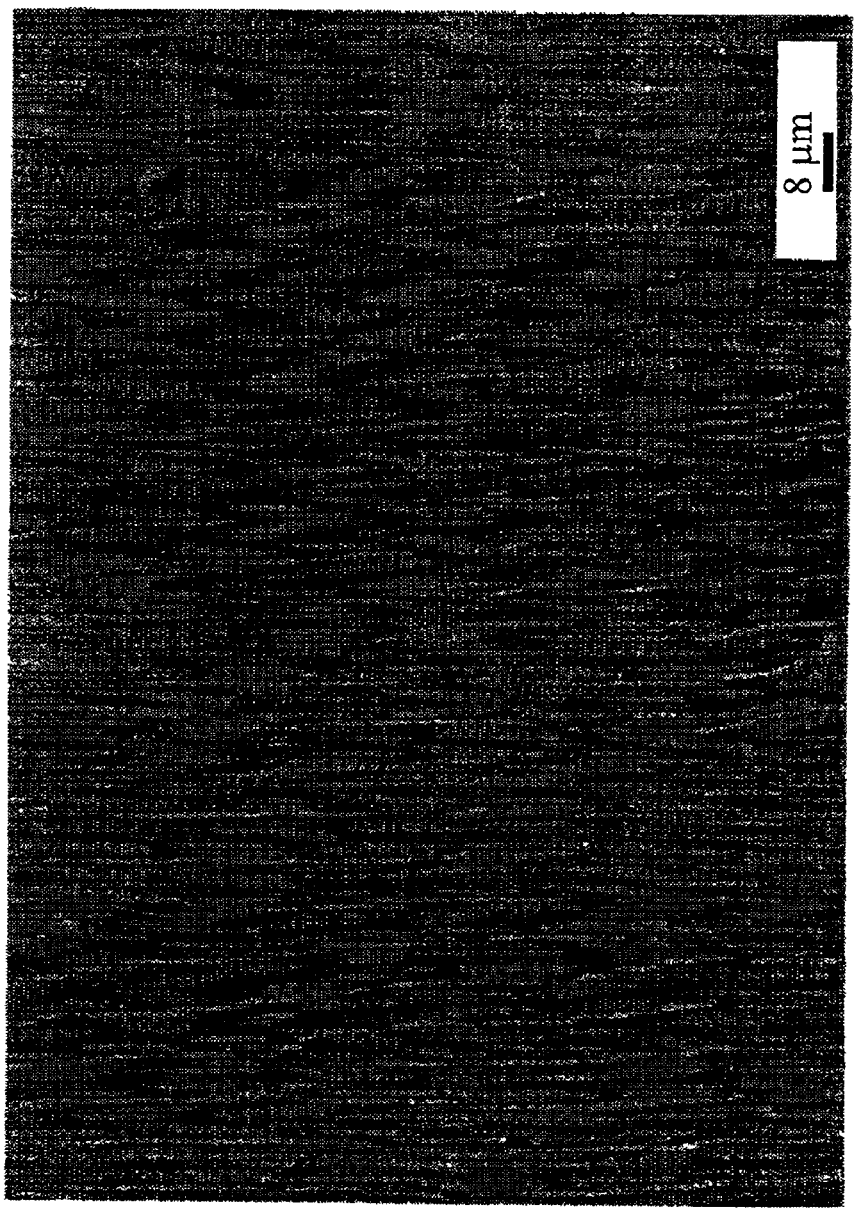
Figure 2B:
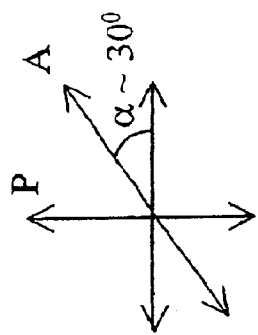
FIG. 2(b) is a microphotograph of a liquid crystal cell with an applied voltage V=2.6 Volts (f=1 kHz), showing polymer micro-walls in planar geometry, under monochromatic light.
Figure 2B:
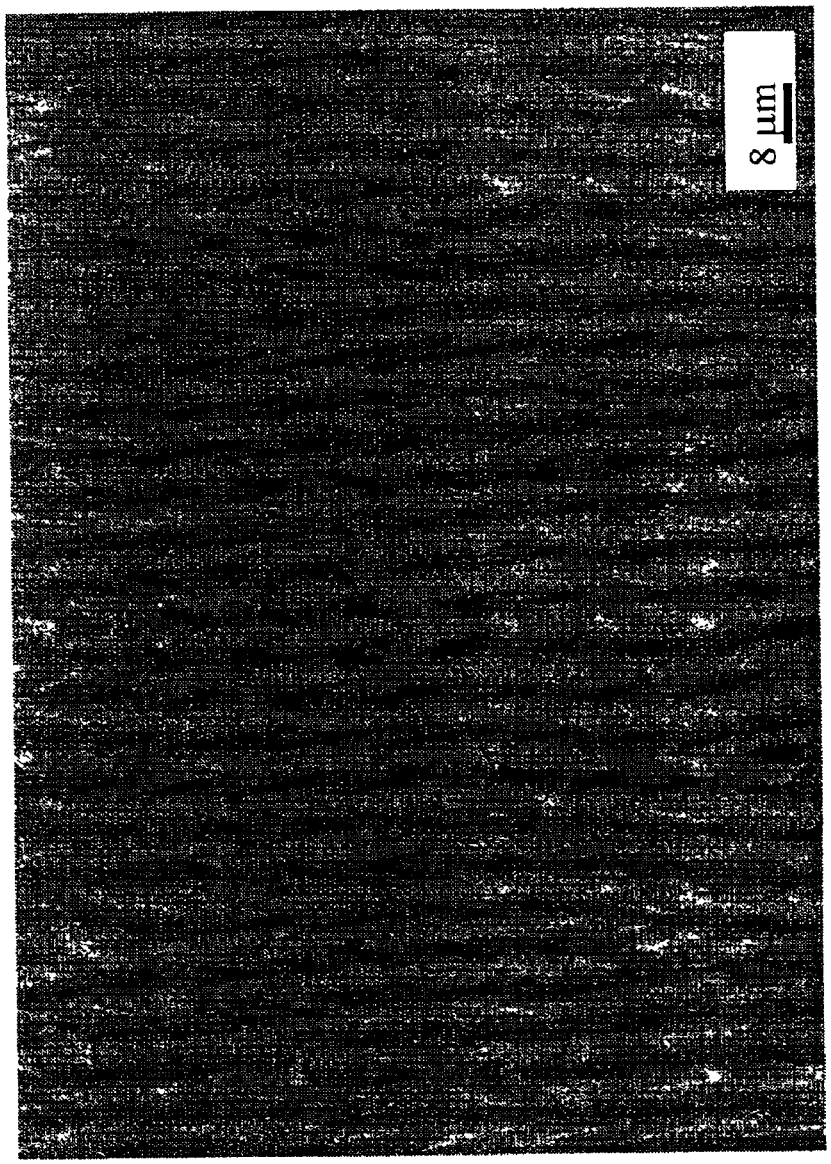

When the flat cell described above was filled with a cholesteric liquid crystal, the helical axis was normal to the cell plates and there was no director modulation in the plane of the cell at zero applied field. When a voltage was applied, the result was a fingerprint texture with director modulations in the plane of the cell. In the initial state, the cell was kept at zero applied field. A modulated cholesteric structure appeared above a threshold voltage $V_{th}$=2.2 Volts, with 'stripes' parallel to the rub directions on the substrates. At constant voltage $V>V_{th}$, the cell was exposed to UV light as in Example 1. FIG. 2a shows the texture in the illuminated cell at an applied voltage of about 2.6 Volts at a frequency of about 1 kiloHertz. FIG. 2b shows the texture under monochromatic light at an applied voltage of about 2.6 Volts at a frequency of about 1 kiloHertz.

EXAMPLE 3

Figure 3:
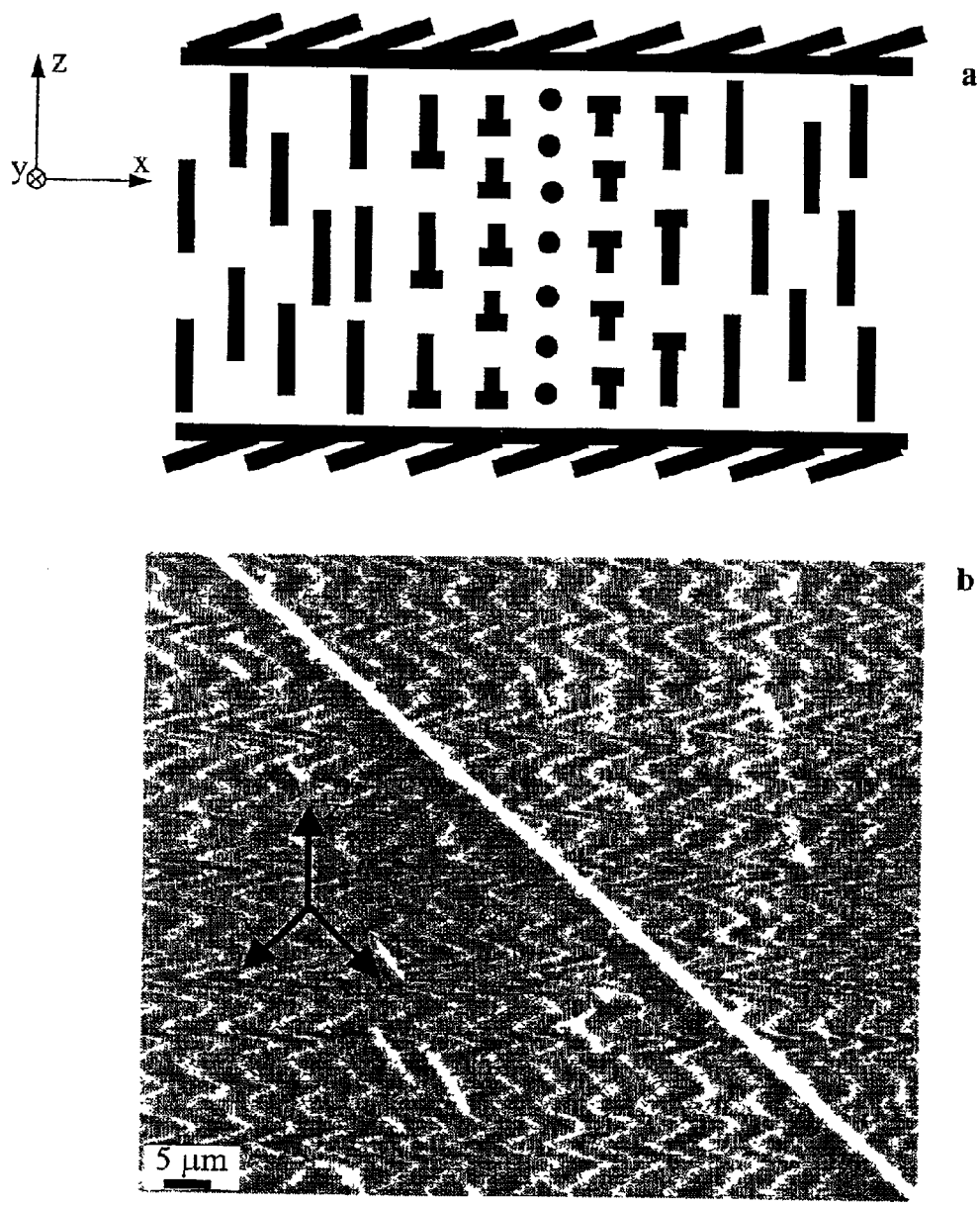
FIG. 3(a) is a schematic representation of 'Bloch wall' nematic director field used to produce polymer micro-wall, the lengths of nails are proportional to projections of molecules on xz-plane, heads are pointed inside the plane, the tips are pointed outwards.
FIG. 3(b) is a scanning electron microscope (SEM) image of a polymer micro-wall formed inside the director field shown on FIG. 3(a).

In Example 3, polymer micro-structures in the form of continuous micro-walls were formed in nematic cells with a homeotropic geometry. A LC cell was assembled from a pair of glass plates coated with poly(vinyl)cinnamate (Aldrich Chemical Co., Inc) and alignment layers irradiated with unpolarized UV light to produce homeotropic alignment. The nematic E7 (EM Industries) was introduced into a cell of gap d of about 2 microns. An inhomogeneous nematic director configuration was in the form of the 'Bloch wall', FIG. 3(a). Such director distortion exists in a nematic sample with its gap, d, less than the anchoring extrapolation length L: d<L=K/W, where K is an average elastic constant of the nematic LC, and where W is the anchoring coefficient of the nematic on the alignment layer. The wall width (~1.8 micrometers) is defined by the strength of the in-plane anchoring balancing the nematic elasticity. 'Bloch wall' director distortion exists in zero-field. The cell was exposed to UV-light as in Examples 1, 2. UV-light caused polymerization of the monomer NOA-65 with its subsequent phase separation and polymer micro-wall formation. Polarizing-microscopy observations and scanning-electron microscopy of the disassembled cell, FIG. 3(b), revealed that the polymer micro-wall formed exactly along the nematic distortion 'Bloch wall'.

It will be appreciated by those skilled in the art that the advantages of the present invention are numerous. Spatially modulated director fields can be used to induce patterning of polymers from liquid crystal solvents. The polymers form micro-structures having a pattern which follows the director texture of the liquid crystal. These patterned micro-structures form a framework for repeatedly and accurately recreating the exact director texture of the liquid crystal. This technique can be used to design switchable diffractive elements with a memorized structure. The diffractive grating can be switched on and off repeatedly. Because the grating does not need to grow, switching times are shorter. At the same time, the grating structure is more flexible than those of the prior art, where the polymer network was employed to stabilize a cholesteric structure. Greater flexibility allows broader switching possibilities and allows having lower values of the switching voltage than heretofore possible. The uniform morphology of the micro-structures significantly reduces unwanted light-scattering over the periodic micro-droplet morphologies of the prior art. Little or no electric field is required to produce the pattern of polymer micro-structures. No lithographic patterning of electrodes is needed, which allows reliable micron-scale patterning. Utilizing the mesogenic properties of the liquid crystal component enables precision on the order of 0.5 microns, a substantial improvement over processes known in the prior art. The process of the invention can be used in manufacturing optical elements such as spatial modulators, diffractive gratings, light deflectors and beam steering devices.

We claim:

1. A method for fabricating a liquid crystal device having polymer micro-structures, the method comprising the steps of:

preparing a mixture comprising a liquid crystal material and a prepolymer;

providing a first and second cell wall structure, said first and second cell wall structures optionally having electrodes disposed on facing sides of said first and second cell wall structures, and, optionally having an alignment layer disposed on at least one of said electrodes;

disposing said mixture into a space between the first and second cell wall structures;

causing said liquid crystal material to assume a predetermined orientation with a non-uniform spatially distorted director field; and exposing said mixture to conditions which cause polymerization of the prepolymer and formation of polymer micro-structures between the cell walls, wherein the micro-structures have a shape and spatial location determined by a director field of said liquid crystal material.

2. A method for fabricating a liquid crystal device having polymer micro-structures according to claim 1, wherein said mixture comprising a liquid crystal material and a prepolymer comprises between about 0.1 percent and about 50 percent prepolymer.

3. A method for fabricating a liquid crystal device having polymer micro-structures according to claim 1, wherein said liquid crystal material is selected from the group consisting of cholesteric liquid crystal material, nematic liquid crystal material, columnar liquid crystal material and smectic liquid crystal material.

4. A method for fabricating a liquid crystal device having polymer micro-structures according to claim 1, wherein said prepolymer is selected from the group consisting of UV-curable prepolymers and heat-curable prepolymers.

5. A method for fabricating a liquid crystal device having polymer micro-structures according to claim 1, wherein said first and second cell wall structures have electrodes disposed thereon, and wherein said step of causing said liquid crystal material to assume a predetermined orientation with a non-uniform spatially distorted director field comprises applying a voltage across said electrodes.

6. A method for forming polymer micro-structures, the method comprising the steps of:
    preparing a mixture comprising a liquid crystal material and a prepolymer;
    providing a first and second cell wall structure;
    disposing said mixture into a space between the first and second cell wall structures;
    causing said liquid crystal material to assume a predetermined orientation with a non-uniform spatially distorted director field; and
    exposing said mixture to conditions which cause polymerization of the prepolymer and formation of polymer micro-structures between the cell walls, wherein the micro-structures have a shape and spatial location determined by a director field of said liquid crystal material.

7. The method for forming polymer micro-structures according to claim 6, wherein the prepolymer is a UV-curable prepolymer and wherein the step of exposing the mixture to conditions which cause polymerization of the prepolymer comprises exposing the prepolymer to UV radiation.

8. The method for forming polymer micro-structures according to claim 6, wherein the first and second cell wall structures additionally comprise electrodes disposed on facing sides of said first and second cell wall structures.

9. The method for forming polymer micro-structures according to claim 6, wherein at least one of said first and second cell wall structures additionally comprise an alignment layer disposed thereon.

10. The method for forming polymer micro-structures according to claim 6, wherein said mixture comprising a liquid crystal material and a curable prepolymer comprises between about 0.1 percent and about 50 percent curable prepolymer.

11. The method for forming polymer micro-structures according to claim 6, wherein said liquid crystal material is selected from the group consisting of nematic liquid crystal material, cholesteric liquid crystal material, columnar liquid crystal material and smectic liquid crystal material.

12. A method for forming a liquid crystal cell comprising the method for forming polymer micro-structures according to claim 6.

13. A liquid crystal cell formed by the method of claim 6.

* * * * *